United States Patent [19]
Schankler

[11] 3,973,740
[45] Aug. 10, 1976

[54] FILM REEL SPACER
[75] Inventor: Martin M. Schankler, East Brunswick, N.J.
[73] Assignee: Microfilm Enterprises Corporation, East Brunswick, N.J.
[22] Filed: Oct. 7, 1975
[21] Appl. No.: 620,428

[52] U.S. Cl.................................. 242/68.5; 242/74
[51] Int. Cl.² ....................................... B65H 17/02
[58] Field of Search............ 242/71.8, 71.8 A, 68.5, 242/74.1, 74, 74.2

[56] References Cited
UNITED STATES PATENTS

| | | | |
|---|---|---|---|
| 1,920,657 | 8/1933 | Morsbach | 242/74 |
| 3,885,751 | 5/1975 | Keich | 242/74.1 |
| 3,889,894 | 6/1975 | Deguchi | 242/74 |

Primary Examiner—Edward J. McCarthy
Attorney, Agent, or Firm—Arthur L. Lessler

[57] ABSTRACT

A spacer for use on microfilm reels to facilitate the storage of relatively small lengths of film thereon. The spacer comprises a unitary structure of resilient material having adjacent separable arcuate end portions which are deflected when the spacer is pressed onto the hub of the film reel, the resilience of the spacer material causing the arcuate end portions to come together when the spacer is on the reel hub. A plurality of spacing bars extend from the circular outer configuration of the spacer to define an inner circle having a diameter substantially equal to the outer diameter of the reel hub. The film to be stored may be threaded onto the reel hub between the arcuate end portions of the spacer.

8 Claims, 8 Drawing Figures

U.S. Patent    Aug. 10, 1976    3,973,740
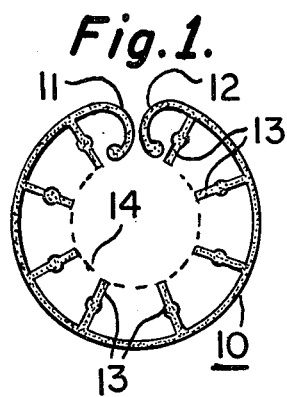
Fig. 1.
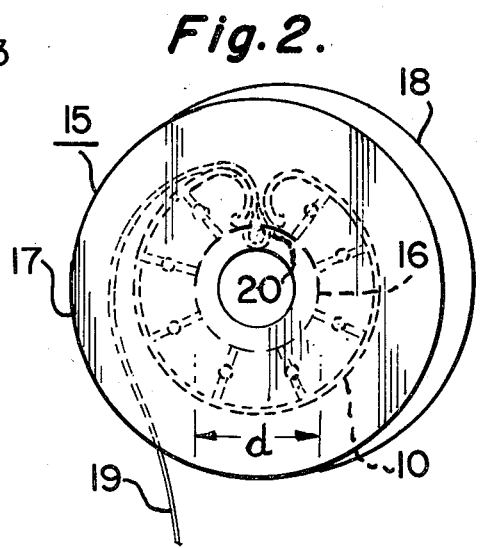
Fig. 2.
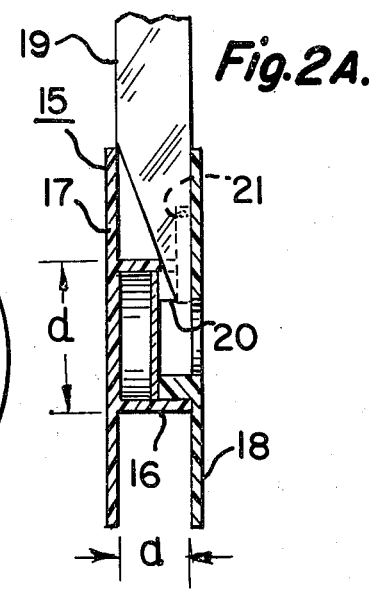
Fig. 2A.
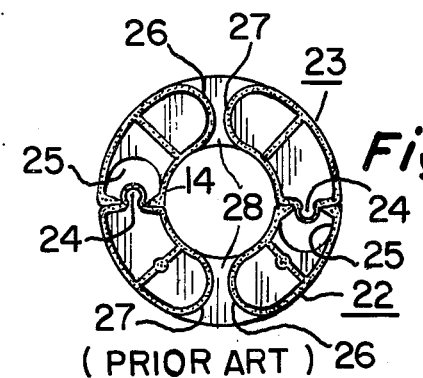
Fig. 3.
(PRIOR ART)
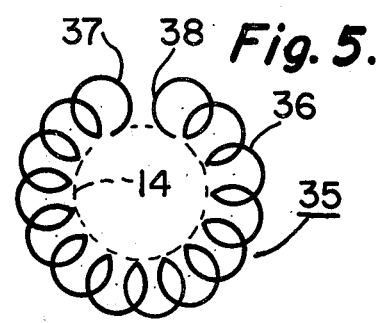
Fig. 5.
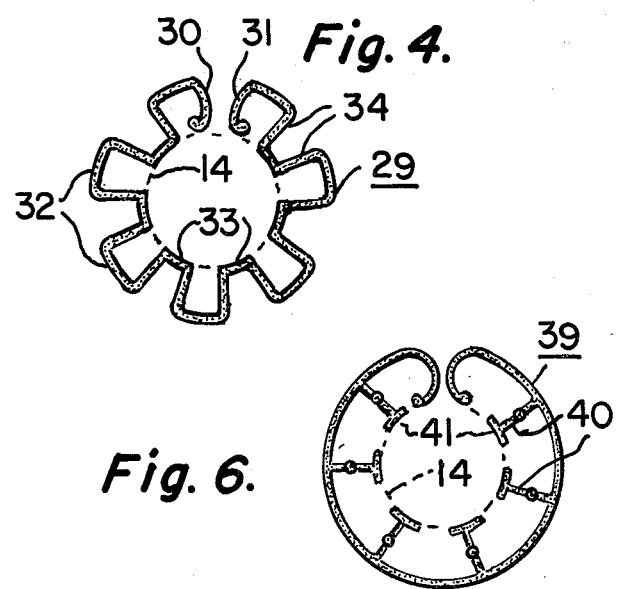
Fig. 4.
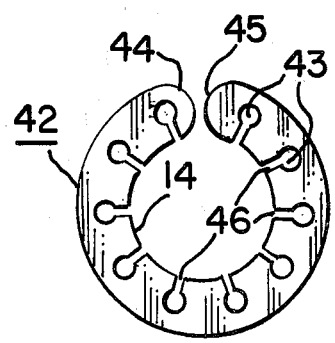
Fig. 7.
Fig. 6.

FILM REEL SPACER

This invention relates to spacers for use with reels, and more particularly a spacer for effectively increasing the diameter of a reel hub.

In the microfilm art, it is common practice to employ film reels which are installed in cartridges in such a manner that the film may be automatically unwound from and wound upon the hub of the film reel when the cartridge is installed in a microfilm processor, reader or other suitable apparatus.

In such applications, the film reel is ordinarily manufactured with a short length of plastic strip, known as a trailer, affixed at one end to the hub of the reel. One end of the film to be stored is attached to the free end of the trailer, and the reel is rotated to wind the film onto the hub. Thereafter the free end of the film is affixed to a relatively short length of plastic strip known as a leader, which for self threading applications may be stiffer and wider than the film itself.

A self threading cartridge arrangement of the type referred to above is described in U.S. Pat. No. 3,150,840.

In employing microfilm cartridges of the type described above, it has been found that difficulties arise when relatively short lengths (typically less than 50 feet) of film are employed. More specifically, it has been found that since such short lengths of film result in a relatively small outer radius of the stored film, upon winding the film onto its reel within a film cartridge employed in an automatic threading apparatus (such as a microfilm reader), the leader enters the cartridge at an excessively steep angle, causing it to jam or bind against the flanges of the film reel, rather than being smoothly wound thereon. To alleviate this problem, a spacer has been devised which effectively increases the diameter of the film reel hub, thus providing a proper entry angle for the leader when relatively short lengths of film are stored on the reel.

However, this prior art film reel spacer comprises two piece parts which must be installed upon the film reel in a particular orientation. The inner diameter of the prior art spacer must be maintained within relatively critical tolerance ranges, and the spacer is relatively difficult to assemble onto and disassemble from the reel hub.

Accordingly, an object of the present invention is to provide an improved spacer suitable for use with a reel upon which a flexible strip material may be wound.

As herein described, there is provided an annular spacing member for use in conjunction with a reel upon which a flexible strip material may be wound, said reel having a circular hub and a pair of spaced side flanges affixed thereto. The spacing member has a circular outer configuration defining a mandrel surface upon which the strip material may be wound. The member has inwardly extending spacing means defining a circle corresponding to the periphery of the reel hub. The spacing member comprises a unitary structure of resilient material having adjacent separable arcuate end portions which may be spread apart to install the spacing member on the reel hub.

In the drawing:

FIG. 1 shows a front view of a spacer according to a preferred embodiment of the present invention;

FIG. 2 shows an isometric view of a film reel upon which the spacer of FIG. 1 may be installed, with the spacer itself shown in phantom view;

FIG. 2A shows a side view of the film reel of FIG. 2, with the spacer omitted, and with a trailer extending from the reel hub;

FIG. 3 shows a front view of a spacer according to the prior art;

FIGS. 4, 5, 6 and 7 show front views of spacers according to alternative embodiments of the invention.

The spacer 10 shown in FIG. 1 comprises a unitary structure of resilient material, is generally annular in shape, and has a circular outer configuration. The spacer has adjacent separable arcuate end portions 11 and 12, and eight inwardly extending spacing bars 13, the innermost extremities of which define a circle 14, indicated by a dashed line in FIG. 1.

The material comprising the spacer 10 is sufficiently flexible so that the arcuate end portions 11 and 12 can be spread apart a distance equal to at least the diameter of the circle 14 and still be urged back together by the resilience of the spacer material when the end portions are released.

The spacer 10 may be made from any suitable material, including metal and plastic. Preferably, the spacer 10 is molded as a unitary piece part, utilizing a plastic such as ABS (acrylonitrile-butadiene-styrene). Other suitable plastics are nylon and acetal resin, certain types of the latter being marketed under the trademark Delrin. Preferably, the material comprising the spacer 10 should have a tensile elastic modulus in the range of 100,000 to 1,000,000 pounds per square inch.

As seen in FIG. 1, the innermost extremities of the arcuate end portions 11 and 12, as well as the center portions of the spacing bars 13, contain enlarged circular portions 14, to facilitate engagement by the mold release pins, i.e. metal pins contained in the mold structure which are extended to push the molded spacer out of the mold.

FIGS. 2 and 2A show a reel 15 upon which a flexible strip material such as motion picture film, magnetic tape or microfilm may be wound. The reel 15 has a circular hub 16 and a pair of spaced parallel circular side flanges 17 and 18 affixed to opposite ends of said hub. The hub 16 has a circular cross section with an outer diameter d. The flanges 17 and 18 are spaced apart by a distance a.

One end of a flexible trailer 19 extends through a slit in the hub 16, said slit extending approximately halfway along the length of the hub. This end of the trailer 19 is wrapped around a post 20 disposed within the hub 16, the extreme end of the trailer being bonded to the adjacent end portion of the trailer by a weld 21. The secured end portion of the trailer 19 is tapered from its normal width to a width sufficiently narrow to enable it to extend through the slit in the hub 16.

The free end of the trailer 19 extends from the space between the flanges 17 and 18, and may be secured to one end of a length of flexible strip material to be wound upon the reel 15. The reel 15 may then be installed in a cartridge such as that shown in U.S. Pat. No. 3,150,840, with the free end of the strip material secured to a relatively stiff and wide leader of the type shown in FIGS. 4 and 9 of said patent.

The completed cartridge assembly, as described above, may then be installed in a self threading utilization apparatus, e.g. magnetic tape recorder/reproducer, microfilm reader, microfilm processor, film projector, etc.

In such self threading cartridge applications, it has been found that unless the outer diameter of the flexible material wound on the hub 16 is sufficiently great, the leader affixed to the strip material enters the cartridge at an excessively steep angle, and has a tendency to jam or bind. Therefore, when relatively short lengths of flexible strip material are to be stored on the reel 15, it is highly desirable to provide a spacer to effectively increase the outer diameter of the stored material. FIG. 3 illustrates such a spacer as is presently utilized, and known in the art.

The spacer shown in FIG. 3 comprises two identical piece parts 22 and 23, formed of a resilient plastic material. Each of the piece parts 22 and 23 is semiannular in configuration, the parts 22 and 23 each having a protuberance 24 and corresponding recess 25, so that the piece parts may be mutually engaged by urging the protuberance 24 of each part into mating relationship with the recess 25 of the other part. Each of the piece parts 22 and 23 has, at the center of the length thereof, adjacent arcuate surface portions 26 and 27, through which the trailer 19 may extend when the spacer assembly is installed on the hub 16 of the reel 15.

The adjacent arcuate portions 26 and 27 of the piece parts 22 and 23 are supported by a web portion 28, so that when one of the piece parts is installed on the hub 16 of the reel 15, care must be taken to insure that (i) the adjacent end portion of the trailer 19 extends into the space between the adjacent arcuate portions 26 and 27 of the piece part, and (ii) the underlying supporting web 28 is disposed away from the slot in the hub 16 through which the end portion of the trailer 19 is wrapped around the post 20. After one of the piece parts is installed in the aforementioned manner, the other piece part must be placed around the hub 16, and the two piece parts 22 and 23 pressed together so that the projections and recesses 24 and 25 of the adjacent portions of the piece parts interlock with each other.

In practice, the process of assembling the prior art spacer shown in FIG. 3 onto the hub 16 of the reel 15 in the aforementioned manner is rather difficult, cumbersome and time consuming, as is the process of removing the spacer therefrom. Furthermore, if the diameter of the circle 14 defined by the innermost portions of the engaged piece parts 22 and 23 is even slightly smaller than the outer diameter d of the hub 16, the piece parts will not properly interlock. On the other hand, it is undesirable to fabricate the prior art structure of FIG. 3 in such a manner that the diameter of the circle 14 is somewhat larger than the outer diameter d of the hub 16, since this will cause the spacer to wobble as the reel 15 is rotated. As a result, for proper operation the prior art structure shown in FIG. 3 must be manufactured with relatively close tolerances on the diameter of the inner circle 14, resulting in increased manufacturing cost and difficulty in accommodating tolerance variations in the outer diameter d of the hub 16 from one reel to another.

The aforementioned difficulties are largely overcome or greatly reduced by the spacer 10 of the present invention, as shown in FIG. 1. To install the spacer 10 on the hub 16 of the reel 15, it is merely necessary to slightly spread apart the arcuate end portions 11 and 12 thereof, dispose said end portions in contact with the portion of the hub 16 which is approximately opposite the slot through which the end portion of the trailer 19 extends into said hub, and press the spacer onto the hub. No great precision is required in initial positioning of the spacer opposite the slot before it is pressed onto the hub. When the spacer 10 has been pressed onto the hub 16, the resilience thereof causes the arcuate end portions 11 and 12 of the spacer 10 to be urged together, thus properly positioning the spacer on the hub.

The flexible nature of the spacer 10 allows it to accommodate tolerance variations in the diameter of the defined inner circle 14 and the outer diameter d of the hub 16. Preferably, the spacer 10 is manufactured so that the inner defined circle 14 has a diameter substantially equal to the outer diameter d of the hub 16, and so that under all anticipated tolerance variation conditions the diameter of the circle 14 is slightly less rather than slightly greater than the outer diameter d of the hub 16. When these tolerance variations occur, the result is merely a slight expansion of the spacer 10, and a slight increase in the distance between the arcuate end portions 11 and 12 thereof, with no significant effect on performance of the spacer. Similarly, spacer 10 is readily, easily and quickly removed from the hub 16 of the reel 15 by spreading apart the arcuate end portions 11 and 12 thereof, and pushing the spacer off the hub. In the embodiment shown in FIG. 1, the relatively small area of contact between the innermost ends of the spacing bars 13 and the hub 16 when the spacer is installed thereon, results in relatively little friction between the same, facilitating installation and removal of the spacer.

The number of spacing bars 13 utilized in the spacer 10 may be less or more than the eight bars shown in FIG. 1. However, the number of spacing bars should preferably not be less than three.

The outer diameter of the spacer 10 is necessarily greater than the outer diameter of the hub 16, and should be less than the diameter of either of the flanges 17 and 18. The width of the spacer 10, i.e. its dimension in a direction normal to the drawing should be slightly less than the distance a between the flanges 17 and 18.

An alternative embodiment of the invention is shown in FIG. 4 and comprises a spacer 29 which may be formed of the the same materials as are utilized to manufacture the spacer 10 shown in FIG. 1. The spacer 29 is a unitary structure having a meandering cross section with adjacent arcuate end portions 30 and 31, which may be separated and, when separated, will be urged together by the resilience of the spacer 29. The outer portions 32 of the meander structure of the spacer 29 define a circle having a diameter greater than that of the hub 16 and less than that of the flanges 17 and 18. The inner portions 33 of the meander structure of the spacer 29 define a circle 14 having a diameter substantially equal to the outer diameter d of the hub 16. Each of the generally radially directed leg portions 34 of the meander structure of the spacer 29 acts as a spacing means to define the distance between the inner and outer diameters of the spacer. The spacer 29 may be installed upon and removed from the hub 16 in the same manner as previously described with respect to the spacer 10.

Similarly, FIG. 5 shows another embodiment of the invention in which the spacer 35 comprises a wire 36 (which may be formed of metal, plastic or another suitable material) formed into an annular spiral configuration with adjacent separable arcuate end portions 37 and 38. The inner and outer circle dimensions, flexible structure and manner of installation and removal of the spacer 35 are similar to the corresponding characteristics of spacers 10 and 29.

In another embodiment of the invention, shown in FIG. 6, a spacer 39 has a structure generally similar to that of the spacer 10. However, the spacer 39 has only six spacing bars 40, and in addition has a curved contact portion 41 disposed at the inner end of each of the spacing bars 40. in all other respects the spacer 39 is similar to the spacer 10.

In another embodiment of the invention, shown in FIG. 7, a spacer 42 comprises a unitary structure, which again may be formed of the same materials as the spacer 10, having adjacent separable arcuate end portions 44 and 45. Additional flexibility is provided by a plurality of transverse apertures 43 in the material of the spacer 42, with slits 46 extending from each of the apertures 43 to the inner defined circle 14. The dimensional characteristics and manner of installation and removal of the spacer 42 are similar to those for the spacers 10, 29, 35 and 39.

I claim:

1. An annular spacing member for use in conjunction with a reel comprising a cylindrical hub having a circular cross-section with a given outer diameter and a pair of spaced parallel circular side flanges affixed to said hub, said spacing member having a circular outer configuration with an outer diameter greater than the outer diameter of said hub and less than the diameter of either of said flanges, the width of said member being slightly less than the space between said flanges, said member having at least three inwardly extending spacing means, the innermost extremities of said spacing means defining a circle having a diameter substantially equal to the outer diameter of said hub, said member comprising a unitary structure of resilient material having adjacent separable arcuate end portions, said end portions being deflectable and separable a distance at least equal to the outer diameter of said hub, so that said member can be installed on said hub by separating said end portions and sliding the thus opened member onto said hub, said end portions of said member being urged into adjacent relationship by the resilience of said member, said member when disposed about said hub serving to effectively increase the outer diameter thereof for any flexible strip material which may be wound thereon.

2. The combination according to claim 1, wherein said member comprises a plastic selected from the group consisting of acrylonitrile-butadiene-styrene, nylon, and acetal resin.

3. The combination according to claim 1, wherein the material comprising said member has a tensile elastic modulus in the range of 100,000 to 1,000,000 pounds per square inch.

4. The combination according to claim 1, wherein each of said spacing means comprises a radially oriented spacing protuberance.

5. The combination according to claim 1, wherein said member has a meandering cross-section, the outer portions thereof defining the outer diameter of said member and the inner portions thereof defining said circle having a diameter substantially equal to the outer diameter of said hub.

6. The combination according to claim 1, wherein said member comprises a wire formed into a spiral configuration.

7. The combination according to claim 1, wherein said member has a plurality of transverse apertures therein, with a slit extending from each aperture inwarly to said circle.

8. An annular spacing member for use in conjunction with a reel upon which a flexible strip material may be wound, said reel having a circular hub and a pair of spaced side flanges affixed thereto, said member having a circular outer configuration defining a mandrel surface upon which said strip material may be wound, said member having inwardly extending spacing means defining a circle corresponding to the periphery of said hub, said member comprising a unitary structure of resilient material having adjacent separable arcuate end portions which may be spread apart to install said member on said hub.

* * * * *